United States Patent [19]

Launay

[11] Patent Number: 4,520,705
[45] Date of Patent: Jun. 4, 1985

[54] APPARATUS FOR DECORATING CONFECTIONERY AND BAKERY PRODUCTS

[75] Inventor: Noël Launay, Beauvais, France

[73] Assignee: Nestec, S. A., Vevey, Switzerland

[21] Appl. No.: 463,932

[22] Filed: Feb. 4, 1983

[30] Foreign Application Priority Data

Feb. 17, 1982 [FR] France ................................ 82 02598

[51] Int. Cl.³ .............................................. B26D 3/08
[52] U.S. Cl. ........................................ 83/879; 83/523; 409/132
[58] Field of Search ..................... 83/879–881, 83/523, 565, 884; 33/27 L, 27 R, 27 D, 27 M, 26; 99/352, 353, 485; 409/131, 132

[56] References Cited

U.S. PATENT DOCUMENTS

| | | | |
|---|---|---|---|
| 1,052,597 | 2/1913 | Lawrence | 83/564 |
| 1,556,151 | 12/1925 | McDonough | 83/884 |
| 2,561,436 | 7/1951 | Bachmann | 33/27 L |
| 2,579,290 | 12/1951 | Bachmann | 33/27 L |
| 3,230,624 | 1/1966 | Fisher | 33/27 L |
| 3,730,032 | 5/1973 | Marckx et al. | 83/884 |
| 4,094,217 | 6/1978 | Exline | 83/879 |
| 4,246,838 | 1/1981 | Pulver et al. | 83/884 |

Primary Examiner—Frank T. Yost
Assistant Examiner—Hien H. Phan
Attorney, Agent, or Firm—Vogt & O'Donnell

[57] ABSTRACT

Apparatus for scoring pastry includes a planetary train having a stationary wheel and a planet wheel in rolling engagement with the stationary wheel. The planet wheel is driven orbitally about the axis of the stationary wheel. A cutting tool mounted to the planet wheel describes repeating tracings and scores the pastry in a pattern corresponding to such tracings.

5 Claims, 4 Drawing Figures

APPARATUS FOR DECORATING CONFECTIONERY AND BAKERY PRODUCTS

BACKGROUND OF THE INVENTION

This invention relates to an apparatus for decorating confectionary and bakery products.

It is known that for the pastry of certain bakery and confectionery products to rise correctly during baking, notably measures of dough and cakes and in particular those of the pie and almond tart types, it is necessary to make scores or cuts in the pastry without, however, cutting right through the pastry. An advantage is then derived from this necessity by providing these cuts or scores with a decorative appearance.

SUMMARY OF THE INVENTION

The present invention relates specifically to a simple apparatus which makes it possible to achieve this result industrially.

This apparatus is essentially characterised in that it comprises at least one cutting tool which is used to act on the pastry and is mounted on an assemblage which is capable of being driven by a movement such that it performs on the pastry one or more repetitive traces which are identical, but are displaced regularly with respect to one another.

To this end, the mobile cutting tool holder assemblage comprises at least one planet wheel rotating around a stationary part in planetary manner and carrying the tool, which is itself capable of being driven, on the one hand by a rotational movement, and on the other hand, by an ascending-descending movement, to act on the pastry at regular intervals after the completion of a given trace.

According to other characteristics:

the cutting tool describes curves of the cycloid type, for example epicycloids or hypocycloids of a diameter such that the tracing intersects the centre of the planetary train;

the ascending-descending movement is obtained by a lifting cam which is mounted on the mobile cutting tool holder assemblage and acts directly on the latter;

the cutting tool is inclined with respect to the vertical;

a spring acts on said cutting tool to ensure the depth of cut.

BRIEF DESCRIPTION OF THE DRAWING

Other characteristics and advantages of the present invention will be revealed more clearly from the following description which is given with respect to the accompanying drawings, provided by way of example.

DESCRIPTION OF THE PREFERRED EMBODIMENTS

Figure 1:
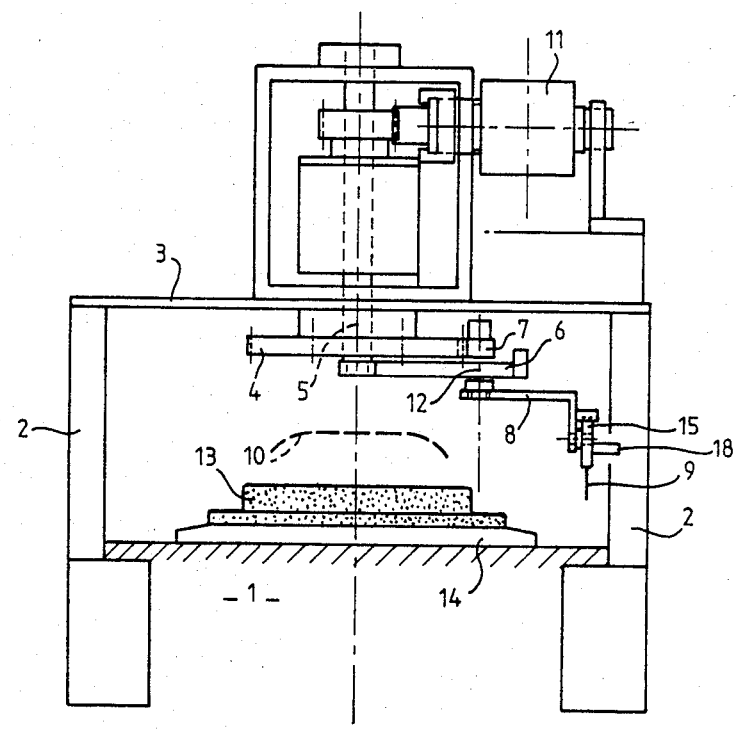
FIGS. 1 and 2 are two elevational views of the apparatus according to the present invention.
Figure 2:
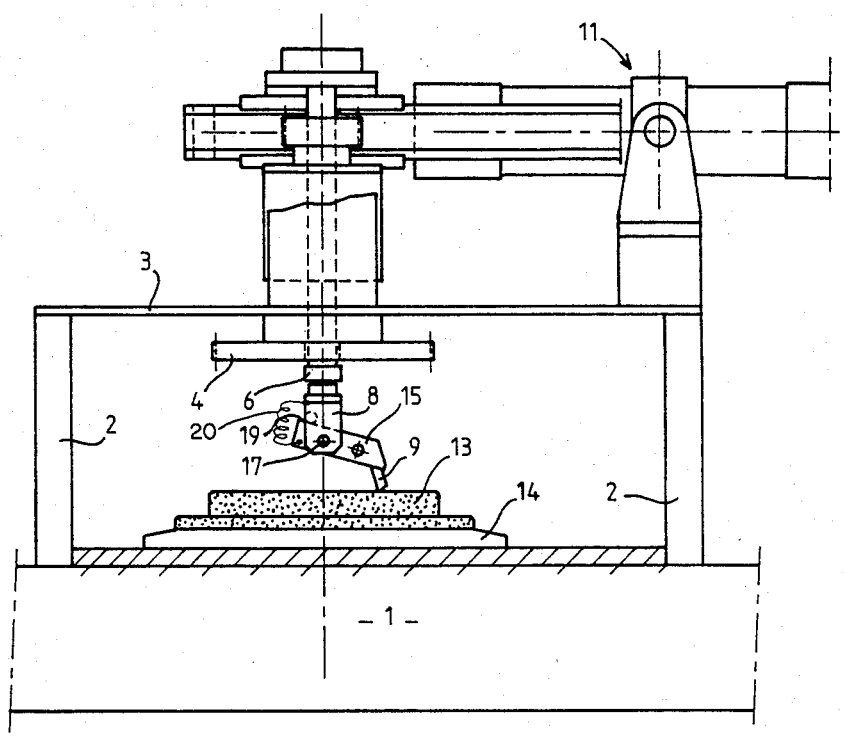
Figure 3:
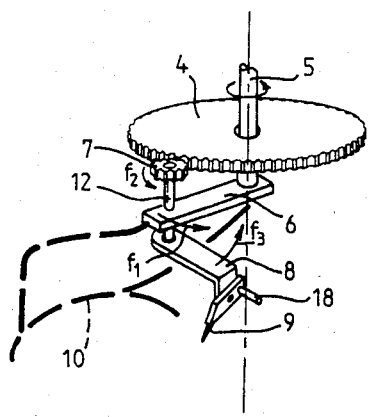
FIG. 3 is a schematic view illustrating the mobile tool holder assemblage.

By referring to these drawings, the apparatus according to the present invention essentially consists of a frame comprising a base 1 on which four columns such as 2 rest, supporting at their top end a plate 3, on which the various essential constituent elements of the apparatus are mounted, namely:

a stationary circular plate 4 which is penetrated by a shaft 5 supporting an arm 6 which is itself penetrated by a shaft supporting at one of its ends a wheel 7 resting against the periphery of the plate 4, and supporting at its other end an arm 8 carrying a cutting tool 9 mounted in a rocking manner, and finally a cam 10 to ensure that the cutting tool is raised at regular intervals, as will be described in the following.

The apparatus is used as follows:

By the action of any means, either manual or using a motor, as illustrated in FIG. 1 by reference numeral 11, in order to cause rotation of the shaft 5, the arm 6 which is supported on said shaft 5 is entrained, for example in the direction of arrow $f_1$. The movement of this arm is manifested by the rotation of the wheel 7 which rests against the edge of the stationary plate 4. Of course, this wheel 7 may be a toothed wheel engaging in a corresponding gearing made on the edge of the plate, or the wheel 7 may be made of any suitable material which has an adequate coefficient of friction so that it can roll, without sliding, on the edge of the plate 4. In a variant which is not shown, the wheel 7 may rest on the inside circular edge of a plate 4, for example in the form of a crown, the wheel then turning in the direction opposite arrow $f_2$, and the tool describing sections of hypocycloids.

In the embodiment which is illustrated, this wheel 7 which is entrained by the arm 6 by means of the shaft 12 rotates in the direction of arrow $f_2$. It is bound to travel over the complete circumference of the plate 4. This rotation is manifested by the corresponding rotation of the knife-carrying device, i.e., of the arm 8 in the direction of arrow $f_3$. Assuming that the knife 9 is in a low position, i.e., in the working position, exerting a cutting effect on the pastry of a confectionery or bakery product 13 supported by a tray 14 resting on the base 1 which supports the complete apparatus, this knife describes an epicycloid portion (for example, such as 16, illustrated in FIG. 4), forming one of the elements of the general trace of the desired decorative pattern. Depending on the displacement angle which exists between the cutting tool-holding device and the cam 10, said knife 9 will continue to exert its action on the pastry until a part 15 (hinged at 17 on the arm 8) comes into contact with the beginning of the cam 10 by means of a finger 18. The part 15 is raised under the effect of this cam. The knife 9 is also raised and no longer performs a trace on the pastry 13.

Due to the fact that the rotational movement of the arm 8 in the direction of arrow $f_3$ continues, the part 15 continues its movement while resting on the complete extent of the cam 10. When it has arrived at the end of this path, it is again released and it falls freely in order to bring, in turn, the cutting tool 9 into contact with the pastry 13 to perform a new trace, such as 16, starting from the centre 0 of the product to be decorated.

The succession of movements which have just been described is manifested as a succession of as many portions of epicycloids 16 as are formed up until the wheel 7, having travelled over the circumference of the plate 4, has returned to its starting point.

Figure 4:
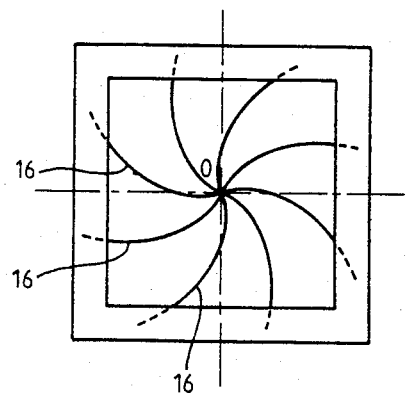
FIG. 4 is a plan view of a regular "Catherine wheel" shaped trace of the type obtained by the apparatus.

In this manner, a decorative pattern is produced which assumes the shape of a Catherine wheel as illustrated in FIG. 4. Of course, it is understood that this pattern may assume any other shape depending on the respective diameters of the elements driven by a relative movement with respect to one another. This pattern generally results from the repetition of a tracing which is identical to itself and is repeated at regular intervals as a function of the length of the cam 10.

The knife 9 is advantageously mounted on its arm 15 while providing an intermediate spring of an adjustable tension 20 which cooperates with a stop 19, making it possible to adjust the depth of the cut into the mass of pastry to be decorated.

In order to facilitate and promote improved rising of the pastry during baking, the knife is mounted so that it acts on the pastry at an angle which differs from an orthogonal angle of attack, particularly in the case of confectionery pastries, termed "flaky pastries". Moreover, the tension of the spring is adjusted so that this pastry is not cut right through its complete thickness, in order to allow the flaky pastry to rise during baking, while maintaining the seal of the measure of dough with respect to the baking juices of a filling contained therein. It is obvious that the present invention has only been described in a purely explanatory and nonlimiting manner, and that any useful modifications may be added thereto without departing from the scope thereof.

I claim:

1. An apparatus for scoring pastry comprising:
   (a) a planetary train including a stationary wheel and a planet wheel in rolling engagement with said stationary wheel, the axes of said wheels being vertical;
   (b) a cutting tool mounted to said planet wheel remote from the axis thereof;
   (c) means for driving the planet wheel around the axis of the stationary wheel, whereby the tool will describe a repeating pattern of horizontally-extensive tracings;
   (d) means for supporting beneath the tool a pastry to be scored; and
   (e) vertical movement means for moving the tool upwardly and downwardly to engage the tool with a pastry supported by said supporting means and disengage the tool from such pastry, whereby the tool will score the pastry in a pattern corresponding to portions of said tracings.

2. An apparatus as claimed in claim 1 in which said cutting tool is mounted to said planet wheel at a distance from the axis of said planet wheel such that said tracings intersect the axis of said stationary wheel.

3. An apparatus as claimed in claim 1 further comprising a first arm fixed to said planet wheel and extending transversely of the axis of said planet wheel, one end of said first arm being remote from the axis of said planet wheel, a second arm rockably mounted to said one end of said first arm, whereby said second arm will describe said tracings upon movement of said planet wheel, said cutting tool being fixed to said second arm, said vertical movement means including a cam engaging said second arm to rock such said second arm relative to said first arm as said second arm describes said tracings.

4. Apparatus as claimed in claim 3 in which said vertical movement means includes a stop fixed to said first arm, said stop limiting rocking movement of said second arm, and a spring biasing said second arm towards said stop.

5. An apparatus according to claim 1, in which the cutting tool is inclined with respect to the vertical.

* * * * *